US011155464B2

(12) United States Patent
Pashkevich et al.

(10) Patent No.: US 11,155,464 B2
(45) Date of Patent: Oct. 26, 2021

(54) METHOD FOR PRODUCING HYDROGEN FLUORIDE FROM ITS AQUEOUS SOLUTIONS

(71) Applicant: OBSCHESTVO S OGRANICHENNOJ OTVETSTVENNOSTJU "NOVYE KHIMICHESKIE PRODUKTI", St. Petersburg (RU)

(72) Inventors: Dmitrij Stanislavovich Pashkevich, St. Petersburg (RU); Dmitrij Anatolevich Mukhortov, St. Petersburg (RU); Valentin Borisovich Petrov, St. Petersburg (RU); Yurij Ivanovich Alekseev, St. Petersburg (RU); Valentin Valerevich Kapustin, St. Petersburg (RU); Pavel Sergeevich Kambur, St. Petersburg (RU); Ilya Andreevich Blinov, St. Petersburg (RU)

(73) Assignee: NEW CHEMICAL PRODUCTS LLC

( * ) Notice: Subject to any disclaimer, the term of this patent is extended or adjusted under 35 U.S.C. 154(b) by 54 days.

(21) Appl. No.: 16/307,096

(22) PCT Filed: Jul. 14, 2017

(86) PCT No.: PCT/RU2017/000525
§ 371 (c)(1),
(2) Date: Dec. 4, 2018

(87) PCT Pub. No.: WO2018/222073
PCT Pub. Date: Dec. 6, 2018

(65) Prior Publication Data
US 2021/0221680 A1    Jul. 22, 2021

(30) Foreign Application Priority Data

Jun. 1, 2017  (RU) .......................... RU2017119381

(51) Int. Cl.
*C01B 7/19* (2006.01)
*B01D 5/00* (2006.01)

(52) U.S. Cl.
CPC .............. *C01B 7/196* (2013.01); *B01D 5/006* (2013.01)

(58) Field of Classification Search
CPC .......... B01D 5/006; C01B 7/195; C01B 7/196
See application file for complete search history.

(56) References Cited

U.S. PATENT DOCUMENTS 2,494,867 A    1/1950  Frey
2,697,065 A    12/1954 Wolf
(Continued)

FOREIGN PATENT DOCUMENTS

RU    2061649 C1    6/1996
RU    2503613 C2    1/2014
RU    2601007 C2    10/2016

OTHER PUBLICATIONS

ESPACENET Machine Translation of RU 2601007 C2 Obtained May 4, 2021 (Year: 2021).*
(Continued)

*Primary Examiner* — Jonathan Miller
(74) *Attorney, Agent, or Firm* — Maschoff Brennan; Jonathan M. Benns

(57) ABSTRACT

Extraction of anhydrous hydrogen fluoride from its aqueous solution is provided. A method provides hydrogen fluoride from aqueous solutions, including the reduction of water component of the aqueous solution at an elevated temperature into carbon oxide, carbon dioxide and hydrogen. The condensation and distillation of the obtained hydrogen fluoride and water vapor are characterized by the fact that the mixture of hydrogen fluoride and water is reduced at a temperature of 800 K and above, the molar ratio of carbon to water in the reducing agent is from 0.5 to 4, and using a (Continued)

reducing agent of the general formula $C_nH_mO_k$, where $k \geq 0$, $m > 0$, and $n > 0$, and the reducing agent may be saturated, unsaturated, aromatic hydrocarbons, oxygen-containing organic compounds, their isomers and their mixtures. The method makes it possible to extract hydrogen fluoride from its mixtures with water in any ratio and from azeotropic mixtures.

2 Claims, 1 Drawing Sheet

(56) References Cited

U.S. PATENT DOCUMENTS

| | | | | |
|---|---|---|---|---|
| 3,687,622 | A * | 8/1972 | Garris | C01B 7/196 423/488 |
| 4,144,158 | A * | 3/1979 | Nagasubramanian | B01D 61/44 204/517 |
| 4,756,899 | A * | 7/1988 | Jenczewski | C01B 7/195 423/483 |
| 5,089,241 | A * | 2/1992 | Smith | A62D 3/35 423/472 |
| 5,108,559 | A * | 4/1992 | Motz | C01B 7/196 205/687 |
| 5,547,909 | A * | 8/1996 | Carlson | B01J 27/32 502/20 |
| 5,785,820 | A * | 7/1998 | Hoffman | C01B 7/0706 159/47.1 |
| 6,346,227 | B1 * | 2/2002 | Lailach | B01J 19/02 423/483 |
| 7,847,142 | B2 * | 12/2010 | Fitt | C07C 2/62 585/802 |
| 9,260,306 | B2 * | 2/2016 | Hagiwara | C01B 7/195 |
| 2009/0029846 | A1 * | 1/2009 | Fitt | C07C 2/62 502/31 |
| 2011/0286911 | A1 * | 11/2011 | Hagiwara | C01B 7/195 423/484 |
| 2016/0176711 | A1 * | 6/2016 | Castillo | C01G 28/005 423/484 |

OTHER PUBLICATIONS

A.S. Berenblyum, L.V. Ovsyannikova, E.A. Katsman, J. Zavilla, S.I. Hommeltoft, Yu.Z. Karasev, Acid soluble oil, by-product formed in isobutane alkylation with alkene in the presence of trifluoro methane sulfonic acid, 2002, Applied Catalysis A, General, 232, pp. 51-58. (Year: 2002).*

International Search Report and Written Opinion dated Feb. 7, 2018 in International Application No. PCT/RU2017/000525.

* cited by examiner

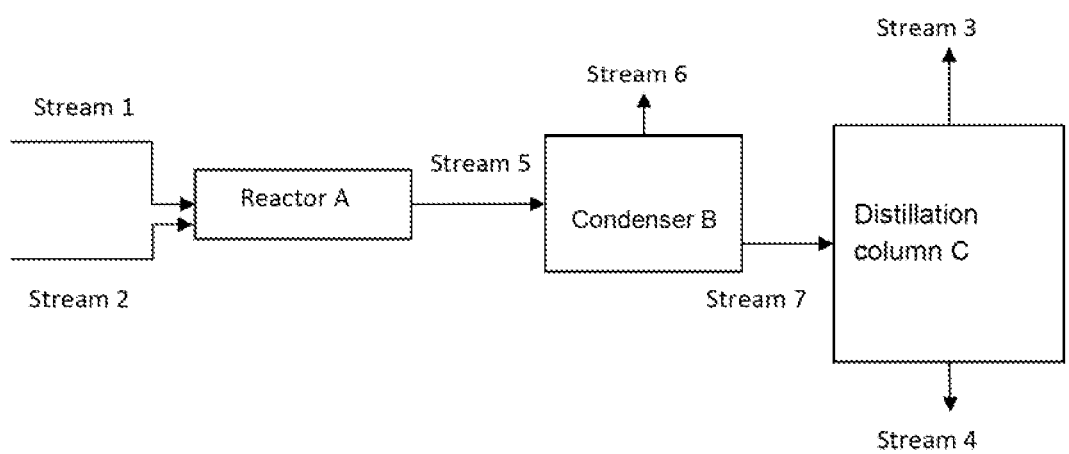

METHOD FOR PRODUCING HYDROGEN FLUORIDE FROM ITS AQUEOUS SOLUTIONS

CROSS-REFERENCE TO RELATED APPLICATIONS

This application is a section 371 nationalization of PCT Application No. PCT/RU2017/000525 filed Jul. 14, 2017, which claims priority to Russian Patent Application No. RU2017119381 filed on Jun. 1, 2017, which applications are incorporated herein by reference in their entirety.

FIELD OF THE INVENTION

This patent relates to the technology of inorganic substances, particularly a method for producing anhydrous hydrogen fluoride (AHF) from its aqueous solution (alternatively, hydrofluoric acid).

BACKGROUND

AHF has widespread industrial applications. It is used in various production processes of chemical industry, for example, in the synthesis of fluorinated coolants, in the production of uranium hexafluoride and more. In many production processes, for example, when processing the U-235 depleted uranium hexafluoride, many aqueous solutions of hydrogen fluoride form. An aqueous solution of hydrogen fluoride with a concentration of approximately 35-40 wt % is azeotropic, i.e. a solution whose individual components cannot be separated by distillation or fractionation.

A known method for producing AHF [Pozin, M. Y., Technology of Mineral Salts. L.: Chemistry, 1974, Vol. 2, p. 1121], in which to process 80% hydrofluoric acid, distillation is used to obtain liquid hydrogen fluoride in distillate containing water impurities and 60% hydrofluoric acid in distillation residue of the column. An additional operation is used to obtain anhydrous hydrogen fluoride: liquid hydrogen fluoride is treated with concentrated sulphuric acid, and 60% hydrofluoric acid returns to the cycle. The limitations to this method are the need to use a two-step process cycle to produce anhydrous hydrogen fluoride and the presence of sulphuric acid waste containing fluoride ions.

Another established method [RF patent 2447013, IPC S01V, pub. Oct. 4, 2012] for producing AHF and hydrofluoric acid is by distilling hydrofluoric acid containing over 65 wt % hydrogen fluoride to product hydrogen fluoride in distillate and hydrofluoric acid in residue of the column. It is distinctive in that the process is conducted at vapor temperature 115° C.-130° C. in the bottom part of the column, in a reflux ratio range of 2-5, wherein the concentration of the base substance in hydrogen fluoride is no less than 99.95 wt % and in hydrofluoric acid 40-45 wt %. This method is limited by the production of a significant amount of hydrogen fluoride in the form of its azeotropic mixture with water, from which it is impossible to produce AHF by distillation.

A known method [RF patent 2601007, IPC C01B 7/19, C01B 3/06, C10J 3/00, pub. Oct. 27, 2016] whereby a hydrogen fluoride solution in water, including an azeotropic solution, is fed to carbon heated to over 1000K. As a result, the carbon reacts with water to form carbon monoxide, carbon dioxide and hydrogen. The reaction products are cooled hydrogen fluoride and unreacted residual water are condensed, and non-condensable gases are turned to neutralization and dispersion. The condensate is a solution of hydrogen fluoride in water, with the concentration of hydrogen fluoride in the initial solution less than in the final solution. The drawback of this method is that solid carbon is used as a raw material. First, its use poses the need to operate equipment for the storing, transporting and dosing bulk materials, which substantially complicates the process flow diagram and increases the number of equipment units. Second, achieving a high purity of the obtained hydrogen fluoride can be accomplished using high-purity carbon. This can be resolved by either introducing an additional pyrolytic treatment of the carbon or by using distillation purification of the obtained hydrogen fluoride. Third, a highly toxic waste is formed during the additional purification of the carbon or hydrogen fluoride.

SUMMARY

The task facing the authors of the proposed patent is to resolve the aforementioned issues, specifically extracting hydrogen fluoride from its aqueous mixtures, and producing AHF and/or concentrated hydrofluoric acid using a greater assortment of substances for reducing agents, while also solving the aforementioned problems, namely: preventing the use of bulk materials, reducing the amount of waste formed, and decreasing the number of process steps.

This is achieved by conducting the interaction of water, which forms part of the mixture of hydrogen fluoride and water, including azeotropic, with reducing agents. It is performed at a high temperature to produce gaseous reaction products: carbon monoxide, carbon dioxide, hydrogen and hydrogen fluoride, with the subsequent cooling of the reaction products to condense the hydrogen fluoride and remaining unreacted water. The hydrogen fluoride in the specified conditions remains unchanged.

BRIEF DESCRIPTION OF THE DRAWINGS

The invention of some of the embodiments will be explained in greater detail below with reference to examples of possible embodiments. Same elements in the figures are indicated by the same index numbers. It should be understood that the drawings are diagrammatic and schematic representations of such example embodiments and, accordingly, are not limiting the scope of the present invention, nor are the drawings necessarily drawn to scale. The drawings show schematically:

FIG. 1 includes a schematic diagram for a system capable of performing separation of hydrogen fluoride from its aqueous solutions.

DETAILED DESCRIPTION

The patent relates to the technology of inorganic substances, namely the extraction of anhydrous hydrogen fluoride from its aqueous solution. Anhydrous hydrogen fluoride is widely used in industry. It is used to conduct various chemical processes, for example, in the synthesis of fluorinated coolants, in the production of uranium hexafluoride and more. The nature of the patent is that a method was developed to obtain hydrogen fluoride from aqueous solutions, including the reduction of water component of the aqueous solution at an elevated temperature into carbon oxide, carbon dioxide and hydrogen. The condensation and distillation of the obtained hydrogen fluoride and water vapor are characterized by the fact that the mixture of hydrogen fluoride and water is reduced at a temperature of 800 K and above, the molar ratio of carbon to water in the reducing agent is from 0.5 to 4, and using a reducing agent of the general formula $C_nH_mO_k$, where k≥0, m>0, and n>0, and the reducing agent may be saturated, unsaturated, aromatic hydrocarbons, oxygen-containing organic compounds, their isomers and their mixtures. The method makes it possible to extract hydrogen fluoride from its mixtures with water in any ratio and from azeotropic mixtures.

The nature of the patent is that a method was developed to obtain hydrogen fluoride from aqueous solutions, including the reduction of water component of the aqueous solution at an elevated temperature to carbon oxide, carbon dioxide and hydrogen, condensation of the obtained hydrogen fluoride and water vapor and their distillation, which is characterized by the fact that the mixture of hydrogen fluoride and water is reduced at a temperature of 800 K and above and with the molar ratio of carbon to water in the reducing agent from 0.5 to 4, and using a reducing agent of the general formula $C_nH_mO_k$, where k≥0, m>0, and n>0, and the reducing agent can be saturated, unsaturated, aromatic hydrocarbons, oxygen-containing organic compounds, their isomers and their mixtures.

The term "reducing agents" means saturated, unsaturated, aromatic hydrocarbons, oxygen-containing organic compounds, such as but not limited to methane, ethane, propane, butane, ethene, propene, ethyne, ethanol, acetone, etc., their isomers and mixtures in various ratios. The specified substances and their mixtures can be defined by the general empirical formula $C_nH_mO_k$, where κ≥0, m>0, and n>0. Using reducing agents with the general empirical formula $C_nH_mO_k$ makes it possible to the use of liquid and/or gaseous compounds in the process, eliminate the introduction of additional purification stages for the raw materials or final product, and reduce the amount of waste generated.

The method for extracting hydrogen fluoride from its aqueous solution, including azeotropic solutions, involves the interaction of water of the specified solution with a reducing agent, followed by condensation and recycling of unreacted aqueous solution, while water oxidizes the carbon-containing material:

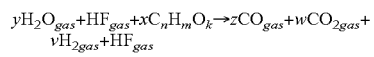
$$yH_2O_{gas}+HF_{gas}+xC_nH_mO_k \rightarrow zCO_{gas}+wCO_{2gas}+vH_{2gas}+HF_{gas}$$

The water is almost fully reduced to hydrogen, while the hydrogen fluoride remains unaffected.

To achieve this result, a mixture of hydrogen fluoride and water is brought into contact with a reducing agent at a temperature above 800 K. Heating is carried out by any known method, including but not limited to heating the walls of the reactor from the outside, feeding an additional reducing agent and oxidant to the reactor and their subsequent combustion, or using a plasma generator. In these conditions, water converts to hydrogen, carbon monoxide and carbon dioxide, and the degree of water conversion is 45-100%. The resulting hydrogen fluoride and unreacted water condense in condensers, and residual gases (carbon monoxide, carbon dioxide, and hydrogen) are fed to neutralization and then disposed. The condensed mixture of hydrogen fluoride and water with a hydrogen fluoride content greater than in the initial mixture is rectified [Corrosion and Protection of Chemical Equipment. Reference. Vol. 1, sub. edited by A. M. Sukhotin. L.: Chemistry, 1969, p. 206], producing primarily AHF as a distillate.

This method extracts hydrogen fluoride from its mixtures with water in any ratio, including azeotropic mixtures, which are typically difficult to accomplish.

The separation of hydrogen fluoride from its aqueous solutions was carried out using an installation, the diagram of which is shown in the FIG. 1, where A—reactor where water is reduced,
B—condenser,
C—distillation column.
Stream 1—reacting agent into reactor A.
Stream 2—mixture of hydrogen fluoride and water into reactor A.
Stream 3—distillate from distillation column B.
Stream 4—distillation residue from distillation column B.
Stream 5—reaction products from reactor A.
Stream 6—non-condensable reaction products, separated in condenser B.
Stream 7—condensed mixture of hydrogen fluoride and water.

Method Embodiment

A reducing agent was fed (Stream 1) into reactor A, in which the target temperature was maintained. The reducing agent composition and reactor temperature are reflected in the Table. A pre-evaporated mixture of hydrogen fluoride and water was also fed to reactor A (Stream 2). In the reactor, the reducing agent reduced the water to form carbon monoxide, carbon dioxide, and hydrogen. The hydrogen fluoride did not react. Reaction products (Stream 5) were sent to condenser B, where they were cooled. The condenser was maintained at a temperature of 190-195 K. Residual water vapor and hydrogen fluoride condensed inside the condenser. Hydrogen, carbon monoxide, and carbon dioxide exited the condenser and were sent for sanitization and dispersion (Stream 6). Condensed hydrogen fluoride and water (Stream 7) were sent to the distillation column B, which was filled with an irregular fluoroplastic packing. In the column, the hydrogen fluoride was separated as a distillate (Stream 3) and hydrofluoric acid at a concentration of 40 wt % as distillation residue.

Experiment Conditions and Results are Listed in the Table A.

The data shows that the problem addressed by the authors of the method was solved, namely the creation of a method to extract hydrogen fluoride from aqueous mixtures, including difficult-to-separate azeotropic solutions, to produce anhydrous hydrogen fluoride and/or concentrated hydrofluoric acid using a greater assortment of substances as reducing agents, while also solving the aforementioned problems, namely: achieving a reduction in the temperature at the reduction stage, preventing the use of bulk compounds, reducing the amount of waste generated, and reducing the number of process steps.

TABLE A

| Reducing Agent | Reactor A Temperature, K | Consumption of Mixture HF and H$_2$O, kg/h (Stream 2) | Concentration of HF in Stream 2, wt % | Reducing Agent Consumption, kg/h (Stream 1) | Consumption of Mixture HF and H$_2$O, kg/h (Stream 7) | Conversion of H$_2$O in Reactor A, % | Unreacted Reducing Agent in Stream 5, kg/h | Distillate Consumption, kg/h (Stream 3) | Concentration of H$_2$O in Distillate in Stream 3, wt % | Consumption of Hydrofluoric Acid of 40 wt % Concentration, kg/h (Stream 4) |
|---|---|---|---|---|---|---|---|---|---|---|
| C$_{4H4}$ | 800 | 0.225 | 45.1 | 0.110 | 0.168 | 46.4 | 0.059 | 0.057 | 99.8 | 0.1102 |
| C$_{4H4}$ | 900 | 0.160 | 46.7 | 0.076 | 0.102 | 67.5 | 0.025 | 0.057 | 99.5 | 0.0457 |
| C$_{4H4}$ | 1000 | 0.165 | 41.2 | 0.086 | 0.085 | 82.5 | 0.015 | 0.057 | 99.6 | 0.0280 |
| C$_3$H$_3$ | 900 | 0.155 | 32.1 | 0.257 | 0.057 | 93.5 | 0.177 | 0.046 | 99.4 | 0.0110 |
| C$_3$H$_3$ | 1000 | 0.170 | 36.0 | 0.266 | 0.067 | 94.9 | 0.182 | 0.058 | 99.9 | 0.0091 |
| C$_2$H$_5$OH | 900 | 0.160 | 46.7 | 0.218 | 0.111 | 57.6 | 0.092 | 0.051 | 99.4 | 0.0598 |
| C$_2$H$_5$OH | 1000 | 0.165 | 41.2 | 0.248 | 0.087 | 80.5 | 0.048 | 0.057 | 98.2 | 0.0299 |
| C$_2$H$_2$ | 1600 | 0.150 | 32.1 | 0.158 | 0.054 | 94.1 | 0.009 | 0.044 | 99.7 | 0.0097 |
| C$_2$H$_2$ | 1600 | 0.236 | 41.2 | 0.200 | 0.106 | 93.4 | 0.013 | 0.092 | 99.4 | 0.0144 |

The invention claimed is:

1. A method to produce hydrogen fluoride from an aqueous solution, the method comprising:

reducing the aqueous solution having hydrogen fluoride and water with a reducing agent for reduction of the water to produce gaseous carbon monoxide, carbon dioxide and hydrogen elevated temperature of 800 K and above;

producing hydrogen fluoride from the aqueous solution with the elevated temperature by distillation with unreacted water;

condensing the obtained hydrogen fluoride; and collecting the condensed hydrogen fluoride and unreacted water vapor;

wherein the molar ratio of carbon in the reducing agent to water is from 0.5 to 4, with the reducing agent having a general formula of $C_nH_mO_k$, where $k \geq 0$, $m > 0$ and $n > 0$.

2. The method in claim 1, wherein the reducing agent is selected from the group consisting of a saturated or unsaturated hydrocarbon reducing agent, aromatic hydrocarbon reducing agent, oxygen-containing organic compound reducing agent, and mixtures thereof.

* * * * *